United States Patent
Tagliaferri

[19]

[11] Patent Number: 6,142,290
[45] Date of Patent: Nov. 7, 2000

[54] CONVEYOR FOR HANDLING REFUSE IN A STREET SWEEPER MACHINE

[75] Inventor: Fabrizio Tagliaferri, Trecasali, Italy

[73] Assignee: Dulevo International S.p.A., Parma, Italy

[21] Appl. No.: 09/093,388

[22] Filed: Jun. 9, 1998

[30] Foreign Application Priority Data

Dec. 5, 1997 [IT] Italy ................................. MI970875 U

[51] Int. Cl.[7] ............................. B65G 19/14; B65G 23/06
[52] U.S. Cl. ........................... 198/716; 198/834; 198/699; 198/731; 198/733
[58] Field of Search ................................. 198/716, 731, 198/733, 834, 699

[56] References Cited

U.S. PATENT DOCUMENTS

| | | | |
|---|---|---|---|
| 2,787,913 | 4/1957 | Hageline | 198/834 |
| 2,930,478 | 3/1960 | Ruffino | 198/731 |
| 3,853,016 | 12/1974 | Lane, III et al. | 198/834 |
| 4,754,521 | 7/1988 | Zoni . | |
| 4,884,313 | 12/1989 | Zoni . | |
| 4,884,393 | 12/1989 | Hilleby | 198/834 |

FOREIGN PATENT DOCUMENTS

| | | |
|---|---|---|
| 0212146 | 3/1987 | European Pat. Off. . |
| 3714976 | 12/1988 | Germany . |
| PR940002 U | 3/1994 | Italy . |

*Primary Examiner*—Christopher P. Ellis
*Assistant Examiner*—Mark A. Deuble
*Attorney, Agent, or Firm*—Browdy And Neimark

[57] ABSTRACT

The invention is directed to a conveyor operated by idler members driven in rotation by a motor (16) which includes a pair of spaced apart flexible elements connected to the idler member and having an endless extension. Refuse transporting blades (8) are in engagement with the pair of flexible elements. The flexible elements are belts (6) having a toothed face (6*a*), and the idler member are bell-shaped bodies (7) each having a shaped support (17) parallel to a respective rotation axis (11*a*), an annular border (18) extending radially from the shaped support (17), and circumferentially spaced pins (19) for meshing with the toothed face (6*a*) of the belts (6). The pins (19) are fixed to the annular border (18) and tangentially overlie the shaped support (17) which supports a portion of the pins (19) in a resting condition.

10 Claims, 3 Drawing Sheets

CONVEYOR FOR HANDLING REFUSE IN A STREET SWEEPER MACHINE

FIELD OF THE INVENTION

The invention relates to a conveyor for handling refuse, in a street sweeping machine, carrying out refuse and dust conveying from a roadway, where said refuse and dust collection takes place, until an overlying container where the latter are stored, to be then brought to a dumping point.

DESCRIPTION OF THE PRIOR ART

Previous studies carried out by the same Applicant, described in U.S. Pat. Nos. 4,754,521 and 4,884,313 have enabled setting up of street sweeping machines internally provided with a conveyor capable of conveying refuse and the like from a roadway to an opening close to the upper end of a storage container.

Such lifting has been provided for enabling refuse unloading from a high position relative to the loading floor of said container.

This gives rise to a complete exploitation of the loading capabilities because even when the container is almost full, it is still possible to carry out loading operations.

Originally, the conveyor set up in said preceding studies has an open structure formed of shovels or blades driven by flexible support and handling members made of endless chains extending between idler members consisting of toothed wheels. This technical solution enables passage, through the conveyor itself, of a strong sucked air stream that helps in conveying refuse and dust towards the container and above all avoids spreading of dust at the roadway height.

Therefore, it is in principle superfluous to spray water over the roadway, at the refuse collecting region, in order to avoid dust spreading.

The conveyor thus made has proved to be advantageous and quite efficient.

However, it has come out that a conveyor structure based on the use of chains and toothed wheels gives rise to some noise during operation and since street sweeping machines are employed above all overnight, reduction of said noise is greatly suggested.

Chains can be replaced by belts and these have the advantage of being more silent in operation and having a lighter weight.

But, on the other hand, application of belts too creates different problems of crucial importance in the particular use in question.

In fact, shovels or blades lifting the refuse are subjected to efforts of some intensity and therefore, on the one hand, it is necessary to fix them to the belts in an efficient manner and, on the other hand, arrangement of belts capable of reliably withstanding the efforts to which they are subjected is required.

But, arrangement of effort-resistant belts necessarily involves use of belts of relatively wide dimensions. In the particular use in question belts of wide dimensions have an essential drawback: as they rest on corresponding pulleys, they give rise to wide contact regions where small debris can easily store, said debris hindering the conveyor movements until making the belts go off their races.

This problem does not exist for chains which have a reduced section and wide openings through which debris can be discharged.

It is pointed out that it is not suitable for the continuous belt structure to be modified in a substantial manner through formation of openings therein, in order to avoid weakening of them in the presence of important efforts, neither is it appropriate that the belt width should be reduced while greatly increasing thickness of same, because by so doing the belt flexibility decreases and in addition the bending efforts become of such an extent that the belt lifetime is reduced.

As regards fastening of blades to the belts, it is to note that the connecting means applied for anchoring the blades to the belts can interfere with pulleys thereby generating noise, so that it is exactly the noiselessness feature for which application of belts is desired that is eliminated.

SUMMARY OF THE INVENTION

Under this situation, the technical task underlying the present invention is to devise a new conveyor capable of eliminating the drawbacks present in known conveyors.

Within the scope of this technical task, it is an important aim of the invention to devise a noiseless and strong conveyor, which substantially cannot be clogged or damaged by the carried debris.

Another important aim is to provide a conveyor that can be also easily applied to street sweeping machines already on the market.

The technical task mentioned and the aims specified are achieved by a conveyor for handling refuse, in a street sweeping machine, comprising at least one motor, a plurality of idler members driven in rotation by said motor and defining respective rotation axes, flexible elements connected to said idler members and having an endless extension, and transport blades in engagement with said flexible elements, said flexible elements being belts having a toothed face, and said idler members being bell-shaped bodies each comprising a shaped support extending in a direction concordant with a respective rotation axis, an annular border extending radially from said shaped support, and a plurality of pins fixed with said annular border and tangentially overlying said shaped support, said shaped support supporting, in a resting condition, a portion of said pins, to be engaged in said toothed face by meshing.

BRIEF DESCRIPTION OF THE DRAWINGS

The detailed description of a preferred embodiment of a conveyor in accordance with the invention is now given hereinafter with reference to the accompanying drawings, in which.

DESCRIPTION OF THE PREFERRED EMBODIMENT

Figure 1:
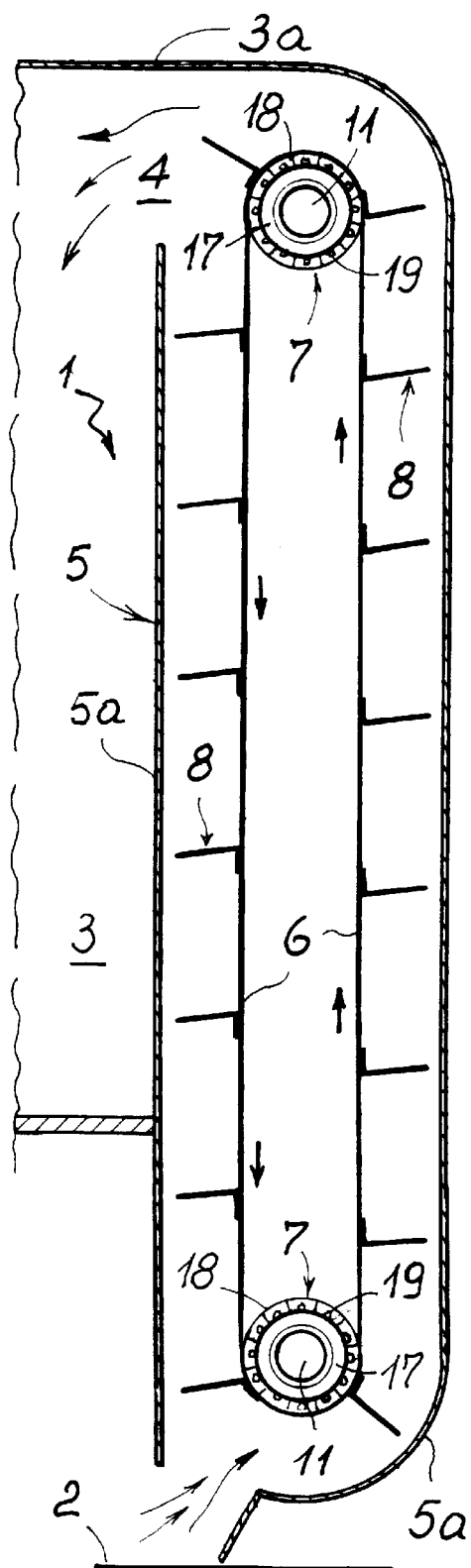
FIG. 1 is a diagrammatic, sectional side view of the conveyor, taken as a whole.

With reference to the drawings, the conveyor according to the invention is generally identified by reference numeral 1.

It is intended applied to a street sweeping machine of the type disclosed in U.S. Pat. Nos. 4,754,521 and 4,884,313 of the same Applicant.

As shown in FIG. 1, conveyor 1 extends in height from a roadway 2 to the top 3a of a container 3 in which refuse is stored, and communicates with the conveyor through an upper window 4.

Conveyor 1 has a conveying channel 5 confined by walls 5a and open at the ends, into which a sucked air stream is routed and in which there are blades 8 for refuse transport, flexible elements for supporting and moving blades 8, and idler members around which the flexible elements are disposed to form an endless configuration.

The sucked air stream is obtained by a fan, not shown, located at one end of container 3 for example, and discharging air to the outside through filters.

Figure 5:
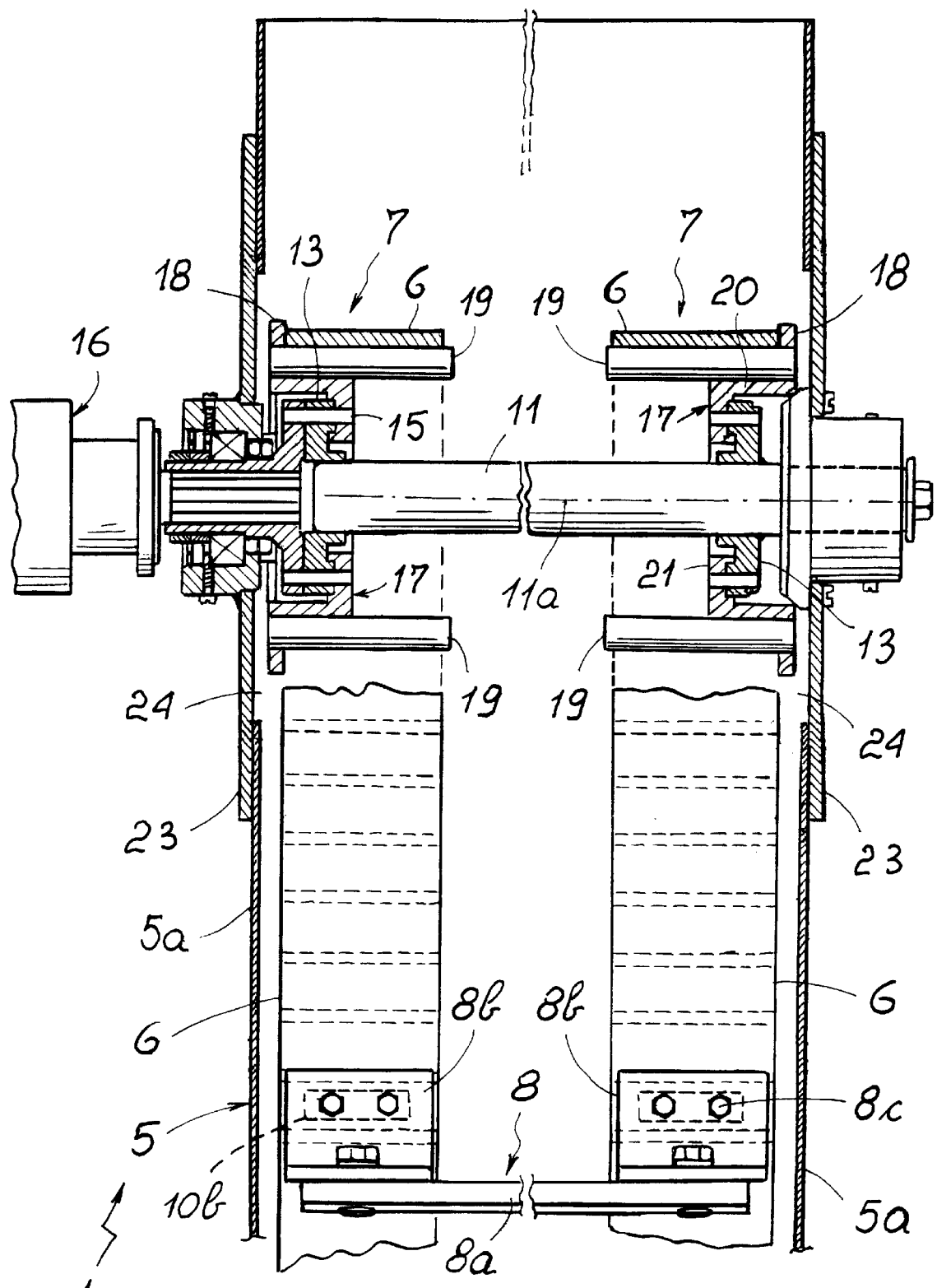
FIG. 5 is a detailed front view of the upper portion of the conveyor.

The flexible elements, as shown in FIG. 5, consist of two transport belts 6 parallel to and spaced apart from each other, made taut between the idler members so as to form an endless configuration, and fixed with blades 8.

Each belt 6 has a first toothed face 6a and a second smooth face 6b in contact with blades 8.

Figure 2:
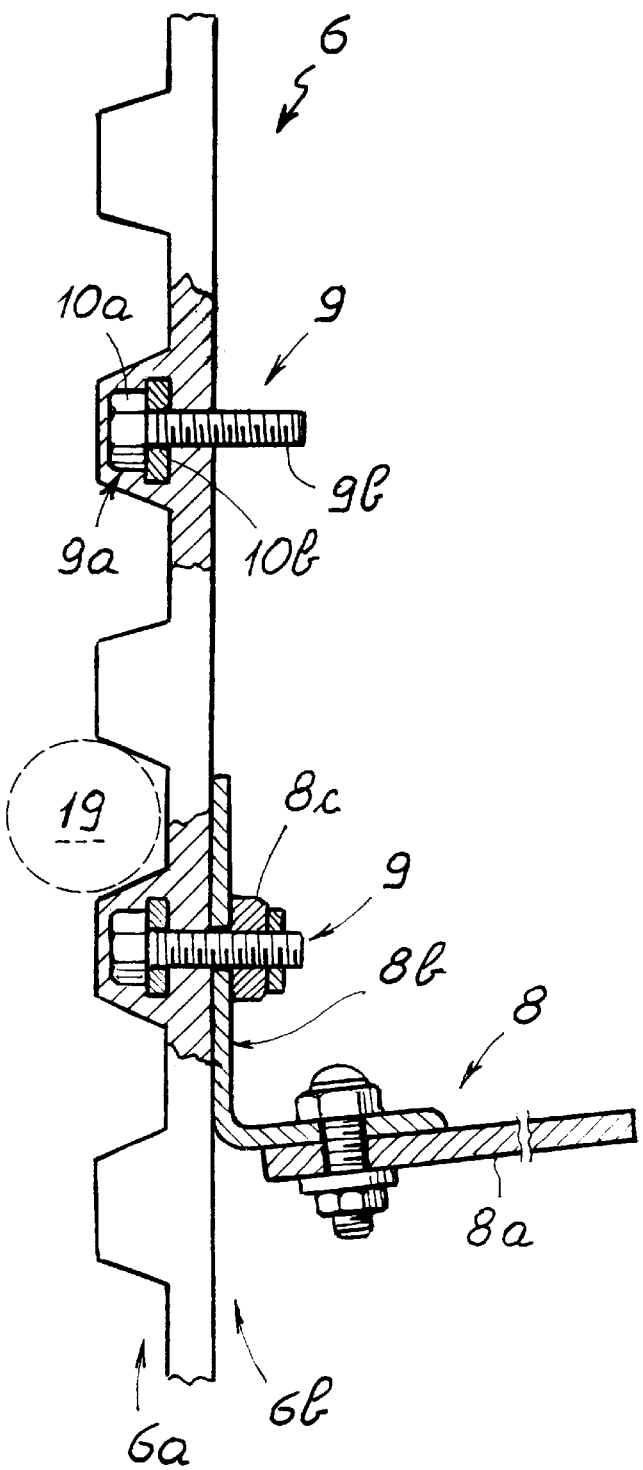
FIG. 2 shows an enlarged portion, partly in section, of the belt of FIG. 1.

As shown in FIG. 2, each belt 6 is integral with metal elements 9 projecting from the second smooth face 6b of the belt itself.

In detail, the metal elements 9 have a first portion 9a internally of belt 6 and a second external portion 9b projecting from the second face 6b.

Preferably, the metal elements 9 are screws and the first inner portion 9a is embodied by a head 10a associated with a small plate 10b.

Blades 8 have a base 8a that by means of right-angled union pieces 8b and nuts 8c is fastened to the metal elements 9. The idle members consist of bell-shaped bodies 7, engaging the belts 6, and they are shown in an isolated position in FIGS. 3 and 4, and in an assembled position in FIGS. 1 and 5. As shown in the last-mentioned figures the bell-shaped bodies 7 have a rotation axis 11a along which a shaft 11 is disposed and said shaped bodies do not directly engage said shaft 11, as they are provided with a central hole 12 of greater diameter than the shaft 11. In fact, a flange 13 fixed in rotation with shaft 11 is interposed between each bell-shaped body 7 and the related shaft 11.

Four bell-shaped bodies 7 and two shafts 11 defining two axes 11a at the upper and lower ends of the conveying channel 5 are present as a whole in the conveyor.

In addition, each bell-shaped body 7 is divided into two halves 7a susceptible of mating at a split 14 lying in a plane passing through the rotation axis 11a. Halves 7a are screwed down in a removable manner to flange 13 by screw connections 15, shown in FIG. 5.

Still with reference to FIG. 5 it is pointed out that at least part of the bell-shaped bodies 7 is powered, due to the presence of a motor 16, for example.

Figure 3:
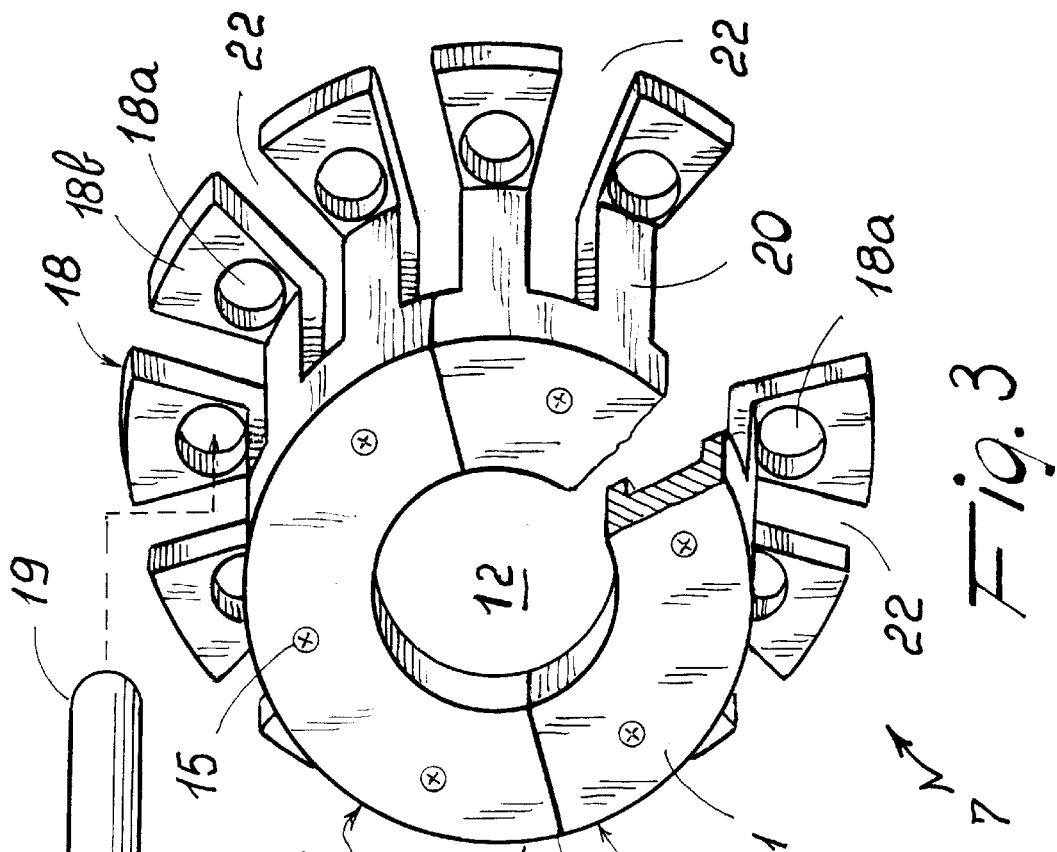
FIG. 3 is an axonometric exploded view partly in split of the structure of a bell-shaped body of the conveyor.
Figure 4:
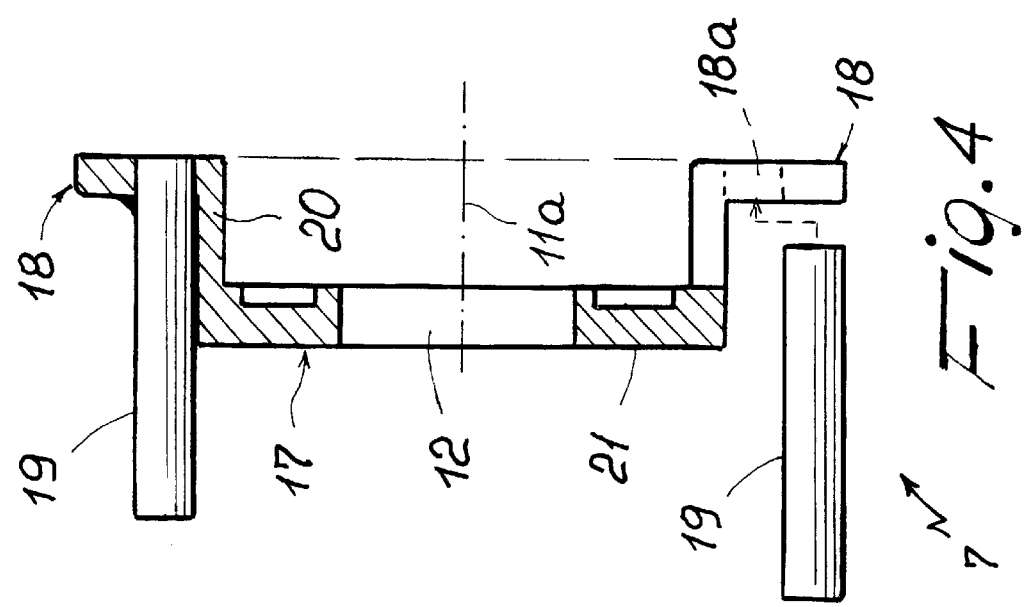
FIG. 4 is a partly exploded, sectional side view of the bell-shaped body of FIG. 3.

As shown in FIGS. 3 and 4, the bell-shaped bodies 7 are embodied by a shaped support 17 extending at least partly parallel to axis 11a, by an annular border 18 radially emerging from one end of the shaped support 17, and by a plurality of pins 19 fixed the annular border 18 and projecting in cantilevered fashion from the latter, in a direction concordant with the shaped support 17 and parallelly of axis 11a.

Practically, pins 19 tangentially surround the shaped support 17, the latter supporting a pin portion in a mere resting condition.

In detail, pins 19 are of cylindrical form and welded at one end thereof to the annular border 18, where circumferentially spaced circular positioning holes 18a are provided which are exactly shaped to size for mating with pins 19.

The shaped support 17 is formed of a tubular protuberance 20 and a disk-like plate 21.

The tubular protuberance 20 extends from the annular border 18 in a direction parallel to pins 19 and to axis 11a over a Length corresponding to about half the length of the pins or smaller than said length, whereas the disk-like plate 21 is parallel to the annular border 18 and perpendicular to the rotation axis 11a and extends from the annular protuberance 20 end opposite to the end engaged by the annular border 18. In addition, the disk-like plate 21 extends in a centripetal direction, until it forms said central hole 12 and is directly connected to said flange 13.

It is also to point out that in the annular border 18 the circular positioning holes 18a terminate tangentially to or flush with the tubular protuberance 20, so that the cylindrical pins 19 are in contact with said tubular protuberance 20 at a portion of a generating line thereof. FIGS. 3 and 4 show that preferably the annular border 18 and tubular protuberance 20 are concerned with through cuts 22 disposed radially of the rotation axis 11a. The through cuts 22 are at the sides of each positioning hole 18a and each pin 19, and divide the annular border 18 and tubular protuberance 20 into segments.

As shown in FIG. 5, the bell-shaped bodies 7 located at the upper part of the conveying channel 5 can be positioned in a vertical direction, so as to enable tensioning of belts 6. Positioning of shaft 11, the related bell-shaped bodies 7 and motor 16 is made possible by engagement of elements 7, 11, 16 with movable supporting plates 23 adapted to cover openings 24 formed in the walls 5a of the conveying channel 5.

The supporting plates 23 are slidably engaged on walls 5a in any suitable manner and also displacement of said supporting plates can be obtained by any tensioning device.

Belts 6 must then keep a correct position in a direction parallel to axes 11a and FIG. 5 shows that a correct position is obtained by virtue of blades 8 connecting belts 6 to each other, and by virtue of the annular borders 18 being in contact with the side edges of belts 6 and projecting externally of blades 8. In fact, each annular border 18 comprises a rim 18b extending in a radial direction beyond the positioning holes 18a.

Practically, due to rim 18b and to the fact that at each axis 11a two bell-shaped bodies 7 mounted in alignment and capable of being overturned in mirror image relationship are provided, the annular borders 18 emerge from an edge of belts 7 to form a lateral holding border of the belts themselves. Operation of the conveyor is as follows.

Belts 6 from a structural point of view appear already arranged for engagement with blades 8, in that the metal elements 9 project from a face thereof. Said metal elements are anchored in a very efficient manner in that they have their first portion 9a completely buried in the belts and locked therein.

The first toothed face 6a is thus completely free from metal elements and in any case from elements projecting in a very localized manner and can ensure a noiseless contact with the bell-shaped body 7.

The bell-shaped bodies 7 have pins of wide sizes, but debris storage is in any case avoided due to the circular section of pins 19 eliminating any flat rest surface thereon, and to the position in cantilevered fashion of the pins themselves which are substantially free because they are only marginally and over a reduced portion thereof in contact with the tubular protuberance 20 of the shaped support 17. In addition, since said support is provided with through cuts 22, its presence does not give rise to debris storage regions.

Although pins are of the cantilevered type and substantially free, strength of the bell-shaped bodies 7 is ensured by partial resting of pins 19 on the shaped support 17. In addition, fastening of said pins 19 in a correct and precise location is very facilitated by arrangement of the positioning holes 18a.

Finally, the bell-shaped bodies 7 can be immediately fitted on flanges 13 and disassembled therefrom, due to their division into two halves 7a. Therefore it is not necessary to axially slip the shaft 11 off for fitting of said bell-shaped bodies.

The invention achieves important advantages.

In fact, the described conveyor reaches the advantages of being noiseless in operation, light in weight and cheap. It is also reliable, of strong structure, can be easily assembled and above all it does not substantially suffer from clogging problems due to debris building-up, which problems are crucial in this type of application.

What is claimed is:

1. A conveyor for handling refuse in a street sweeping machine, comprising: at least one motor (16), a plurality of idler members driven in rotation by said motor (16) and defining respective rotation axes (11a), flexible elements connected to said idler members and having an endless extension, and transport blades (8) in engagement with said flexible elements, said flexible elements being belts (6) having a toothed face (6a), and said idler members being bell-shaped bodies (7) each comprising a shaped support (17) extending in a direction concordant with a respective rotation axis (11a), an annular border (18) extending radially from said shaped support (17), and a plurality of pins (19) fixed to said annular border (18) and tangentially overlying said shaped support (17), said shaped support (17) supporting, in a resting condition, a portion of said pins (19), to be engaged in said toothed face (6a) by meshing.

2. The conveyor as claimed in claim 1, wherein said pins (19) are substantially of cylindrical form and have a portion of a generating line thereof in contact with said shaped support (17).

3. The conveyor as claimed in claim 1, wherein said annular border (18) is fixed to one end of said pins (19) and has circumferentially spaced positioning holes (18a) for said end.

4. The conveyor as claimed in claim 1, wherein said shaped support (17) comprises a tubular protuberance (20) extending over a length substantially corresponding to or smaller than half the length of said pins (19), and wherein said annular border (18) extends from one end of said tubular protuberance (20) and has positioning holes (18a) for said pins (19) tangential to said tubular protuberance (20), said tubular protuberance (20) embodying a resting portion for said pins (19).

5. The conveyor as claimed in claim 4, wherein said annular border (18) comprises a rim (18b) extending in a radial direction from said positioning holes (18a), said rim (18b) emerging from an edge of said belts (6) for embodying a lateral holding border of said belts (6), two bell-shaped bodies (7) spaced apart from each other and in mirror image relationship being arranged at either one of said rotation axes (11a).

6. The conveyor as claimed in claim 4, wherein said shaped support (17) comprises a disk-like plate (21) integral with said tubular protuberance (20), said disk-like plate (21) being transverse to said axis and to a substantially median portion of said pins (19).

7. The conveyor as claimed in claim 1, wherein said shaped support (17) has a plurality of through cuts (22) adapted to divide said annular border (18) and shaped support (17) into segments, said through cuts (22) being located at the sides of said pins (19).

8. The conveyor as claimed in claim 1, wherein each of said bell-shaped bodies (7) is divided into two halves (7a) susceptible of mating with each other at a plane passing through a respective rotation axis (11a), and wherein each of said halves (7a) is fastened in a removable manner by screw elements (15).

9. The conveyor as claimed in claim 1, wherein for engagement of said blades (8) with said belts (6) metal elements (9) are provided which have a first portion (9a) completely buried in said belts (6) and a second portion (9b) projecting from a face of said belts (6) opposite to said toothed face (6a).

10. The conveyor as claimed in claim 9, wherein said metal elements (9) are substantially screws and wherein said first portion (9a) buried in said belts (6) is embodied by a head (10a) of said screws and a small plate (10b) extending from said head (10a).

* * * * *